(12) United States Patent
Zhang et al.

(10) Patent No.: US 9,226,360 B2
(45) Date of Patent: Dec. 29, 2015

(54) BOOSTING CIRCUIT, BACKLIGHT DRIVING CIRCUIT AND BACKLIGHT MODULE

(71) Applicants: BOE TECHNOLOGY GROUP CO., LTD., Beijing (CN); BEIJING BOE DISPLAY TECHNOLOGY CO., LTD., Beijing (CN)

(72) Inventors: Bin Zhang, Beijing (CN); Liang Zhang, Beijing (CN); Weihao Hu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/370,187

(22) PCT Filed: Mar. 29, 2013

(86) PCT No.: PCT/CN2013/073453
§ 371 (c)(1),
(2) Date: Jul. 1, 2014

(87) PCT Pub. No.: WO2014/121549
PCT Pub. Date: Aug. 14, 2014

(65) Prior Publication Data
US 2015/0264770 A1    Sep. 17, 2015

(30) Foreign Application Priority Data

Feb. 6, 2013   (CN) .......................... 2013 1 0047913

(51) Int. Cl.
*H02M 3/155*   (2006.01)
*G09G 3/34*    (2006.01)
*H05B 33/08*   (2006.01)

(52) U.S. Cl.
CPC .......... *H05B 33/0851* (2013.01); *H05B 33/089* (2013.01)

(58) Field of Classification Search
None
See application file for complete search history.

(56) References Cited

U.S. PATENT DOCUMENTS 8,860,398 B2 *  10/2014  Mulligan et al. ............... 323/315
2009/0230881 A1 *  9/2009  Chen et al. ..................... 315/294

FOREIGN PATENT DOCUMENTS

KR   20090015609 A  *  2/2009  ............. G02F 1/133

OTHER PUBLICATIONS

International Search Report Appln. No. PCT/CN2013-073453; Dated Nov. 14, 2013.
First Chinese Office Action Appln. No. 201310047913.4; Dated Sep. 2, 2014.

* cited by examiner

*Primary Examiner* — Nicholas Lee
*Assistant Examiner* — Duane N Taylor, Jr.
(74) *Attorney, Agent, or Firm* — Ladas & Parry LLP

(57) ABSTRACT

A boosting circuit, a backlight driving circuit and a backlight module are provided. The boosting circuit comprises a boosting chip (U1), an energy-storage inductor (L1), a freewheeling diode (D1), a first capacitor (C1), and a current mirror unit (U2), wherein an input terminal of an inputting branch of the current mirror unit (U2) IS connected with the cathode of the freewheeling diode (D1), and an output terminal of the inputting branch is connected with the signal input terminal (Vin) of the boosting circuit through a first resistor (R1), an input terminal of an outputting branch of the current mirror unit (U2) IS connected with the cathode of the freewheeling diode (D1), an output terminal of the outputting branch is grounded through a second resistor (R2), an ungrounded terminal of the second resistor (R2) is connected with a signal feedback pin of the boosting chip. The boosting circuit realizes the tracking of changes of the input voltage by the output voltage under the precondition that parameters of respective elements are unchanged, and achieves the effect that a voltage difference between the output voltage and the input voltage is fixed.

20 Claims, 2 Drawing Sheets

BOOSTING CIRCUIT, BACKLIGHT DRIVING CIRCUIT AND BACKLIGHT MODULE

TECHNICAL FIELD

The present disclosure relates to a field of signal control technique, and more particularly, to a boosting circuit having a fixed voltage difference based on an existing boosting circuit, a backlight driving circuit and a backlight module.

BACKGROUND

Recently, a boosting circuit is generally required in an application circuit such as a liquid crystal display and the like, to drive LEDs (Light Emitting Diodes) for backlights of a liquid crystal display panel, and the brightness of the LED may be adjusted usually according to displaying requirements of the display panel in different cases.

Particularly, as illustrated in FIG. 1, which is an schematic diagram of a basic structure of a boosting circuit as known, the boosting circuit comprises a boosting chip U1, a energy-storage inductor L1, a freewheeling diode D1, a first capacitor C1, a second capacitor C2, a third capacitor C3, a first resistor R1, a second resistor R2 and a third resistor R3, and the like, wherein:

one terminal of the energy-storage inductor L1 is connected with the signal inputting terminal (Vin) of the boosting circuit, the other terminal thereof is connected with the pin (Vsw) of large current switch of the boosting chip and is further connected with the signal outputting terminal (Vout) of the boosting circuit through the freewheeling diode D1. The first capacitor C1, the first resistor R1 and the second resistor R2 are all located on the same side to the signal outputting terminal; one terminal of the first capacitor C1 is connected with the cathode of the freewheeling diode D1, and the other terminal is grounded; one terminal of the first resistor R1 is connected with the cathode of the freewheeling diode D1, and the other terminal is grounded through the second resistor R2, and the ungrounded terminal of the second resistor R2 is connected with the signal feedback pin (VFB) of the boosting chip U1. Further, the power supply inputting pin (VCC) of the boosting chip U1 is connected with the signal inputting terminal, the loop compensating pin (VC) is grounded through the second capacitor C2 and the third resistor R3 which are connected in series, and the signal inputting terminal is grounded through the third capacitor C3.

Particularly, in the boosting circuit shown in FIG. 1, the object of boosting can be achieved by controlling on and off of the internal integrated field effect transistor M1 (not shown in FIG. 1) in the boosting chip U1. Specifically, when the internal integrated field effect transistor M1 in the boosting chip U1 is turned on, the freewheeling diode D1 is reverse cutoff, the current of the energy-storage inductor L1 increases continually, and the energy-storage inductor L1 stores energy. When the internal integrated field effect transistor M1 in the boosting chip U1 is turned off, the energy-storage inductor L1 charges the first capacitor C1 on the signal outputting terminal side through the freewheeling diode D1 to complete the energy transfer. By switching on or off the internal integrated field effect transistor M1 in the boosting chip U1 repeatedly and feedback controlling, an effect that the output voltage is steadied at the set case (at this time, the boosting circuit is in the stable operation state) can be realized. In details, when the boosting circuit is in the stable operation state, the feedback voltage received externally by the signal feedback pin (VFB) of the boosting chip U1 would finally be steadied around the internal feedback reference voltage (a set value associated with the boosting chip) of the signal feedback pin (VFB) of the boosting chip U1. Commonly, the feedback voltage at this time may be considered as being identical to the internal feedback reference voltage of the signal feedback pin (VFB) of the boosting chip U1.

The applicants find that, in the known boosting circuit, for example, as illustrated in FIG. 1, the input voltage is boosted typically in a manner of a wide input voltage range and a fixed output voltage. That is to say, the output voltage of such boosting circuit generally cannot track changes of input voltage when the input voltage changes. In particular, when the output voltage of the boosting circuit is required to be adjusted, it is usual that parameters of each electronic component in the boosting circuit should be reconfigured, such that the application scope of such boosting circuit is not broad, which decreases user's experience.

SUMMARY

Embodiments of the present disclosure provide a boosting circuit for settling the existing problem in the art that output voltage of the boosting circuit is fixed thereby changes of input voltage cannot be traced.

A boosting circuit comprises a boosting chip, an energy-storage inductor, a freewheeling diode and a first capacitor, in which one terminal of the energy-storage inductor is connected with a signal input terminal of the boosting circuit, the other terminal thereof is connected with a pin of large current switch of the boosting chip and is further connected with a signal outputting terminal of the boosting circuit through the freewheeling diode; one terminal of the first capacitor is connected with a cathode of the freewheeling diode, and the other terminal is grounded; the boosting circuit further comprises a current mirror unit, wherein:

an input terminal of an inputting branch of the current mirror unit is connected with the cathode of the freewheeling diode, and an output terminal of the inputting branch is connected with the signal input terminal of the boosting circuit through a first resistor;

an input terminal of an outputting branch of the current mirror unit is connected with the cathode of the freewheeling diode, and an output terminal of the outputting branch is grounded through a second resistor, where an ungrounded terminal of the second resistor is connected with a signal feedback pin of the boosting chip.

Further, a third resistor is connected in series between the output terminal of the outputting branch of the current mirror unit and the second resistor.

Further, the current mirror unit comprises a first transistor and a second transistor;

herein, a first electrode of the first transistor is connected with the input terminal of the inputting branch of the current mirror unit, a second electrode of the first transistor is connected with the output terminal of the inputting branch of the current mirror unit, and a third electrode of the first transistor is connected with a third electrode of the second transistor and is further connected with the second electrode of the first transistor;

a first electrode of the second transistor is connected with the input terminal of the outputting branch of the current mirror unit, and a second electrode of the second transistor is connected with the output terminal of the outputting branch of the current mirror unit.

Further, the first transistor and the second transistor are PNP-type transistors, NPN-type transistors or MOS (Metal Oxide Semiconductor) transistors.

Further, the freewheeling diode is a Schottky transistor.

Further, a power supply input pin of the boosting chip is connected with the signal input terminal of the boosting circuit, and an analog ground pin and a power supply ground pin are grounded.

Further, a loop compensating pin of the boosting chip is grounded through a series branch comprising of a second capacitor and a fourth resistor.

Further, the signal input terminal is grounded through a third capacitor.

In one embodiment of the present disclosure, the current mirror unit enables a voltage difference of a fixed value to be existed between an output voltage of the boosting circuit and an input voltage of the boosting circuit, when the boosting circuit is in a stable operation state.

In one embodiment of the present disclosure, amplitude of the output voltage of the boosting circuit is adjusted according to a voltage difference between a feedback voltage received from the signal feedback pin and an internal feedback reference voltage of the boosting chip.

In one embodiment of the present disclosure, a duty ratio of a control signal is adjusted by adjusting a pulse width of an integrated field effect transistor inside the boosting chip, and in turn a duration of turning on the internal integrated field effect transistor is adjusted, so that the value of the output voltage of the boosting circuit is adjusted.

The embodiments of the present disclosure further provide a backlight driving circuit comprising the boosting circuit described above.

The embodiments of the present disclosure further provide a backlight module comprising the backlight driving circuit described above.

The embodiments of the present disclosure can achieve the following beneficial effects.

In solutions according to the embodiments of the present disclosure, tracking of changes in the input voltage by the output voltage is realized under the precondition that parameters for respective elements in the original boosting circuit are unchanged, by adding the current mirror unit on the side of the signal output terminal of the original boosting circuit, which achieves the effect that a voltage difference between the output voltage and the input voltage is fixed.

DETAILED DESCRIPTION

Embodiments of the present disclosure would be further described in connection with drawings below, but the present disclosure is not limited to the following embodiments.

Figure 1:
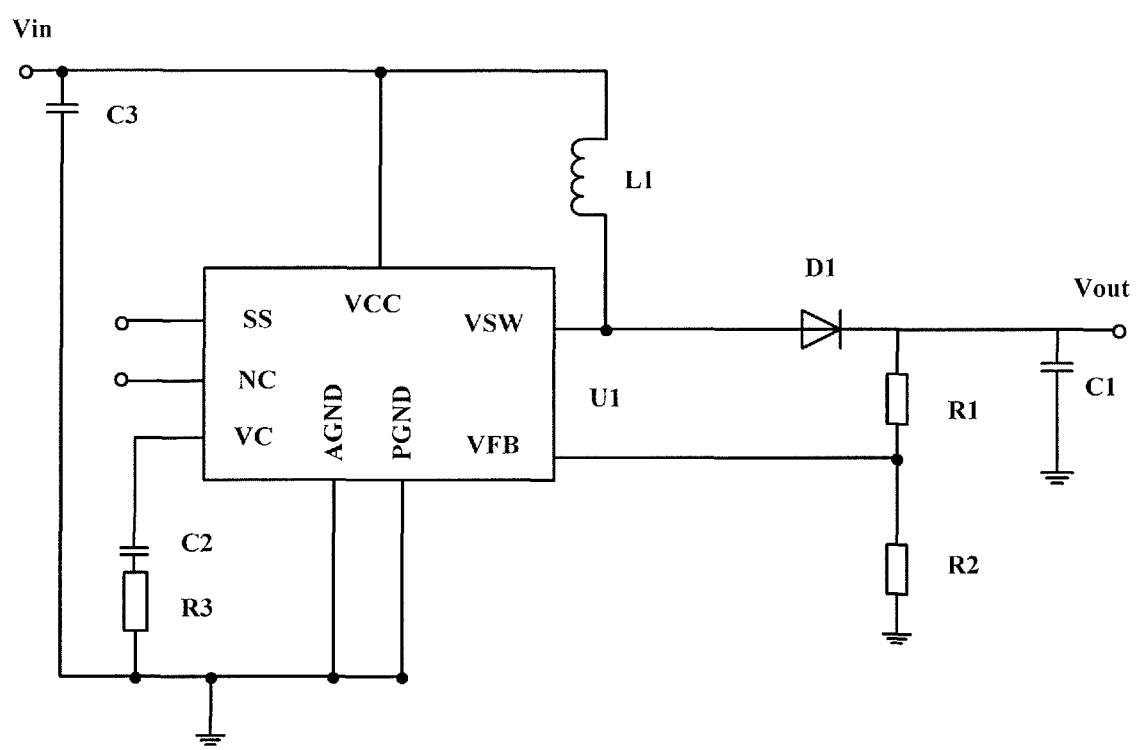
FIG. 1 is a schematic diagram illustrating a basic structure of a known boosting circuit.
Figure 2:
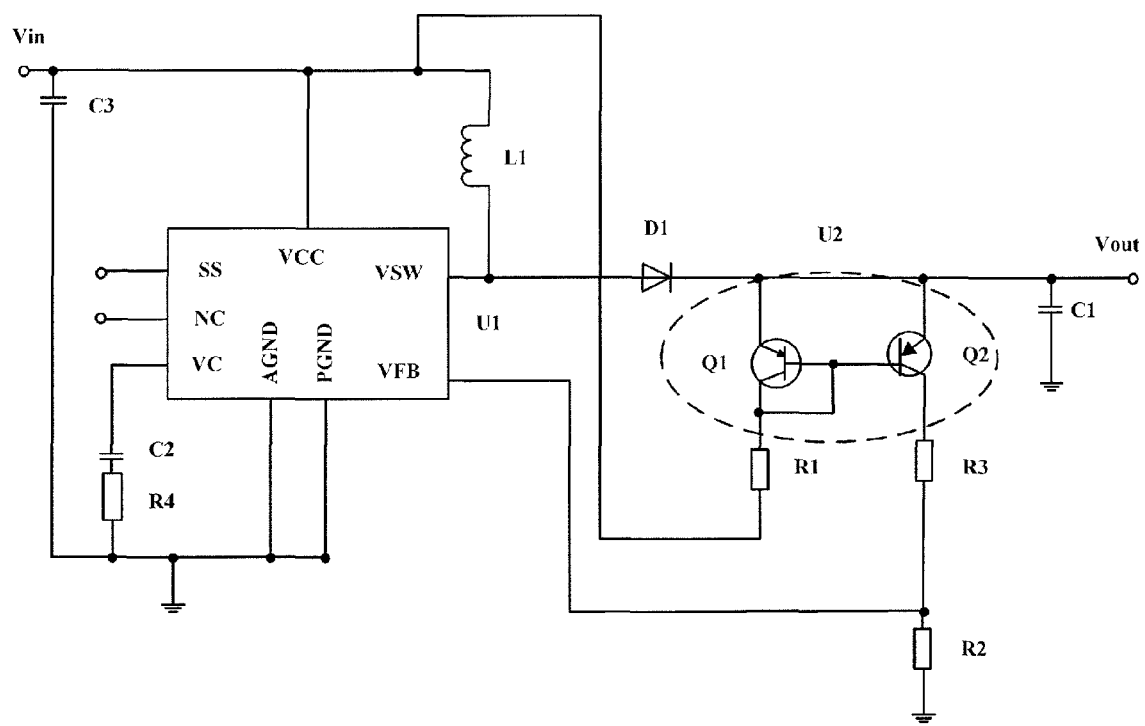
FIG. 2 is a schematic diagram illustrating a basic structure of a boosting circuit according to embodiments of the present disclosure.

The embodiments of the present disclosure provide a new boosting circuit on a basis of an existing boosting circuit. As shown in FIG. 2, which is a schematic diagram illustrating a basic structure of a boosting circuit according to embodiments of the present disclosure, the boosting circuit comprises:

a boosting chip U1, an energy-storage inductor L1, a freewheeling diode D1 and a first capacitor C1, herein, one terminal of the energy-storage inductor L1 is connected with a signal inputting terminal (Vin) of the boosting circuit, the other terminal thereof is connected with a pin (Vsw) of a large current switch of the boosting chip and is further connected with a signal output terminal (Vout) of the boosting circuit through the freewheeling diode D1; one terminal of the first capacitor C1 is connected with a cathode of the freewheeling diode D1, and the other terminal is grounded. Specifically, the boosting circuit further comprises a current mirror unit U2. The current mirror unit U2 is disposed on the side of the signal output terminal of the boosting circuit, and may be illustrated by the dotted line in FIG. 2, herein:

an input terminal of an inputting branch of the current mirror unit U2 is connected with the cathode of the freewheeling diode D1, and an output terminal of the inputting branch is connected with the signal input terminal of the boosting circuit through a first resistor R1;

an input terminal of an outputting branch of the current mirror unit U2 is connected with the cathode of the freewheeling diode D1, and an output terminal of the outputting branch is grounded through a second resistor R2, herein an ungrounded terminal of the second resistor R2 is connected with a signal feedback pin VFB of the boosting chip U1.

Specifically, models, parameters and the like of the boosting chip U1 may be set depending on an actual situation, and the embodiments of the present disclosure have no limitations thereto. It should be noted that, for any boosting chip U1 with a specific model, the internal feedback reference voltage $V_{F1}$ at the signal feedback pin VFB of the boosting chip U1 is fixed. For example, taking a boosting chip with a model of CS5171 as an example, the internal feedback reference voltage $V_{F1}$ of the boosting chip U1 is 1.27V. Further, when the output voltage of the boosting circuit is steadied at the set case (at this time, the boosting circuit is in a stable operation state), an feedback voltage $V_{F2}$ received externally by the signal feedback pin VFB of the boosting chip U1 would finally be steadied around the internal feedback reference voltage $V_{F1}$. In general, the feedback voltage $V_{F2}$ at this time may be considered as being identical to the internal feedback reference voltage $V_{F1}$ at the signal feedback pin of the boosting chip U1.

Further, a third resistor R3 may be connected in series between the output terminal of the outputting branch of the current mirror unit U2 and the second resistor R2, in which the third resistor R3 may play a role of divider.

Further, the current mirror unit U2 comprises a first transistor Q1 and a second transistor Q2; herein a first electrode of the first transistor Q1 is connected with the input terminal of the inputting branch of the current mirror unit U2, a second electrode of the first transistor Q1 is connected with the output terminal of the inputting branch of the current mirror unit U2, and a third electrode of the first transistor Q1 is connected with a third electrode of the second transistor Q2 and is further connected with the second electrode of the first transistor Q1;

a first electrode of the second transistor Q2 is connected with the input terminal of the outputting branch of the current mirror unit U2, and a second electrode of the second transistor Q2 is connected with the output terminal of the outputting branch of the current mirror unit U2

It should be noted that the first transistor Q1 and the second transistor Q2 are transistors with the same type and the same parameters. It should be additionally noted that the current mirror unit U2 may further comprise other types of electronic elements, besides the first transistor Q1 and the second transistor Q2, and the embodiments of the present disclosure have no limitations thereto.

Further, a connection relationship between the first transistor Q1 and the second transistor Q2 may be further expressed as follows.

The first electrode of the first transistor Q1 is connected with the cathode of the freewheeling diode D1, the second electrode of the first transistor Q1 is connected with the signal input terminal of the boosting circuit through the first resistor R1, the third electrode of the first transistor Q1 is connected with the third electrode of the second transistor Q2 and is further connected with the second electrode of the first transistor Q1;

the first electrode of the second transistor Q2 is connected with the cathode of the freewheeling diode D1, and the second electrode of the second transistor Q2 is grounded through the second resistor R2. When the third resistor R3 is further connected in series between the output terminal of the outputting branch of the current mirror unit U2 and the second resistor R2, the second electrode of the second transistor Q2 is grounded sequentially via the third resistor R3 and the second resistor R2 connected in series.

That is to say, the first electrode of the first transistor Q1 may be regarded as the input terminal of the inputting branch of the current mirror unit U2, the second electrode of the first transistor Q1 may be regarded as the output terminal of the inputting branch of the current mirror unit U2, while the first electrode of the second transistor Q2 may be regarded as the input terminal of the outputting branch of the current mirror unit U2, and the second electrode of the second transistor Q2 may be regarded as the output terminal of the outputting branch of the current mirror unit U2.

Further, the first transistor Q1 (or the second transistor Q2) may be a PNP-type transistor, a NPN-type transistor or a MOS transistor, and the embodiments of the present disclosure have no limitations thereto. When the first transistor Q1 or the second transistor Q2 is the PNP-type, the first electrode of the first transistor Q1 or the second transistor Q2 is an emitter of the PNP-type transistor, the second electrode of the first transistor Q1 or the second transistor Q2 is a collector of the PNP-type transistor, and the third electrode of the first transistor Q1 or the second transistor Q2 is a base of the PNP-type transistor. When the first transistor Q1 or the second transistor Q2 is the NPN-type, the first electrode of the first transistor Q1 or the second transistor Q2 is an collector of the NPN-type transistor, the second electrode of the first transistor Q1 or the second transistor Q2 is an emitter of the NPN-type transistor, and the third electrode of the first transistor Q1 or the second transistor Q2 is a base of the NPN-type transistor.

Specifically, taking the boosting circuit shown in FIG. 2 as an example, the current mirror unit U2 comprises the first transistor Q1 and the second transistor Q2, herein, both of the first transistor Q1 and the second transistor Q2 are the PNP-type transistors, and the first transistor Q1 locates in the input branch of the current mirror unit U2, the second transistor Q2 locates in the output branch of the current mirror unit U2, therefore the connection relationship between the first transistor Q1 and the second transistor Q2 may be as follows.

The emitter (e) of the first transistor Q1 is connected with the cathode of the freewheeling diode D1, the collector (c) of the first transistor Q1 is connected with the signal input terminal of the boosting circuit through the first resistor R1, the base (b) of the first transistor Q1 is connected with the base of the second transistor Q2 and the collector of the first transistor Q1; the emitter of the second transistor Q2 is connected with the cathode of the freewheeling diode D1, and the collector of the second transistor Q2 is grounded sequentially through the third resistor R3 and the second resistor R2 connected in series.

It should be noted that, in order to enhance the efficiency of the entire boosting circuit, the freewheeling diode D1 is generally a Schottky transistor with a small forward voltage drop and a good recovery characteristic, the energy-storage inductor L1 is generally an inductor with a low value of equivalent in-series resistors, such as an inductor with a low direct-current resistance of 22 µH.

Further, a power supply input pin (VCC) of the boosting chip is connected with the signal input terminal of the boosting circuit, an analog ground pin (AGND) and a power supply ground pin (PGND) are grounded, a loop compensating pin (VC) of the boosting chip may be grounded through a series branch comprising of electronic elements such as a second capacitor C2, a fourth resistor R4, etc. Further, the boosting chip may further be equipped with a synchronizing and shutting-down pin (SS) and an Enable terminal (NC)

Furthermore, the signal input terminal of the boosting circuit may be also grounded through a third capacitor C3, where the third capacitor C3 may play a role of filter.

Specifically, an operation principle of the boosting circuit according to the embodiments of the present disclosure will be described in briefly by taking the boosting circuit shown in FIG. 2 as an example.

In the boosting circuit as shown in FIG. 2, the object of boosting can also be achieved by controlling on and off of an internal integrated field effect transistor M1 (not shown in FIG. 2) in the boosting chip U1. Specifically, when the internal integrated field effect transistor M1 in the boosting chip U1 is turned on, the freewheeling diode D1 is reverse cutoff, the current in the energy-storage inductor L1 increases continually, and the energy-storage inductor L1 stores energy. When the internal integrated field effect transistor M1 in the boosting chip U1 is turned off, the energy-storage inductor L1 charges the first capacitor C1 on the signal output terminal side through the freewheeling diode D1 to complete the transferring of the energy. By switching on or off the internal integrated field effect transistor M1 in the boosting chip U1 repeatedly and voltage feedback controlling, an effect that the output voltage is steadied at the set case (at this time, the boosting circuit is in the stable operation state) may be realized.

When the boosting circuit is in the stable operation state, the feedback voltage $V_{F2}$ received externally by the signal feedback pin of the boosting chip U1 would finally be steadied around the internal feedback reference voltage $V_{F1}$ at the signal feedback pin of the boosting chip U1. Commonly, the feedback voltage $V_{F2}$ at this time may be regarded as being identical to the internal feedback reference voltage $V_{F1}$ at the signal feedback pin VFB of the boosting chip U1. Meanwhile, because the current mirror unit U2 exists in the boosting circuit, and a voltage (which is equal to the output voltage Vout of the boosting circuit) at the input terminal of the inputting branch of the current mirror unit U2 has a following relationship with a voltage at the output terminal of the inputting branch of the current mirror unit U2 (which is equal to the input voltage Vin of the boosting circuit):

$$\text{Vout-Vin}=\text{Vbe}\,(Q1)+I1R1.$$

where I1 is current flowing through the first transistor Q1 in the current mirror unit U2, whose amplitude and direction are the same as those of current I2 flowing through the second transistor Q2 (where $I2=V_{F2}/R2$, and $V_{F2}=V_{F1}$ when the boosting circuit is in the stable operation state); Vbe (Q1) is a forward voltage drop between the base and the emitter of the first transistor Q1, about 0.6~0.8V in general, and the values of Vbe corresponding to different transistors may be different; Vout is the output voltage of the boosting circuit, and Vin is the input voltage of the boosting circuit.

Therefore, when the boosting circuit is in the stable operation state, due to the existence of the current mirror unit U2 a voltage difference with a fixed value of Vbe (Q1)+R1 $V_{F2}$/R2 would exist between the output voltage of the boosting circuit and the input voltage of the boosting circuit, so that a boosting effect with a fixed voltage difference can be achieved.

Further, taking the boosting circuit shown in FIG. 2 as an example, a process of voltage feedback controlling of the boosting circuit may be described as follows:

In the boosting circuit with the fixed voltage difference illustrated in FIG. 2, the current I1 in the inputting branch of the current mirror unit U2 has a following relationship with the output voltage and the input voltage of the boosting circuit:

$$I1=(\text{Vout}-\text{Vin}-\text{Vbe}\,(Q1))/R1,$$

Therefore, amplitude of the current I1 in the inputting branch of the current mirror unit U2 may be calculated according to the resistance of the first resistor R1, amplitude of the output voltage of the boosting circuit and amplitude of the input voltage of the boosting circuit. Accordingly, based on the mirror principle, the current I2 flowing through the second transistor Q2 has the same amplitude as that of I1. Further, amplitude of the feedback voltage $V_{F2}$ fed back to the signal feedback pin VFB of the boosting chip U1 may be obtained according to a resistance of the second resistor R2, after the amplitudes of the I1 and I2 are obtained. Further, after the boosting chip U1 receives the feedback voltage $V_{F2}$, a duty ratio of a control signal PWM (Pulse Width Modulation) wave of the internal integrated field effect transistor M1 in the boosting chip may be adjusted according to a voltage difference between the feedback voltage $V_{F2}$ and the internal feedback reference voltage $V_{F1}$ of the boosting chip U1 to achieve the objects of adjusting the turning-on duration of the internal integrated field effect transistor M1 and adjusting the amplitude of the output voltage of the boosting circuit. Further, after obtaining the adjusted output voltage, the amplitude of the current in the current mirror unit U2 can be recalculated according to the adjusted output voltage, and the value of the feedback voltage $V_{F2}$ fed back to the signal feedback pin terminal of the boosting chip U1 can be redetermined, and the processes are repeated until the feedback voltage $V_{F2}$ fed back is equal to the internal feedback reference voltage $V_{F1}$ at the signal feedback pin of the boosting chip U1. At this time, the boosting circuit is in the stable operation state, and the voltage difference with the value of Vbe(Q1)+R1$V_{F2}$/R2 may exist between the output voltage of the boosting circuit and the input voltage of the boosting circuit.

It should be noted that the values of the voltage difference between the output voltage and the input voltage, the input voltage, and resistance values of each resistance element in the boosting circuit may be adjusted and set separately depending on actual situation, and the embodiments of the present disclosure have no limitations thereto.

It should be noted additionally that connection relationships among the related electronic components in the solutions according to the embodiments of the present disclosure may be direct connected relationship, or also may be indirect connected relationship, and the embodiments of the present disclosure have no limitations thereto.

In solutions according to the embodiments of the present disclosure, tracking the changes in the input voltage by the output voltage is realized under the precondition that parameters for respective elements in the original boosting circuit are unchanged, by adding the current mirror unit on the side of the signal output terminal of the original boosting circuit, which achieves the effect that a voltage difference between the output voltage and the input voltage is fixed. The embodiments of the present disclosure provide a new adjustment manner of the output voltage which is easy to be realized and has low cost thereby user's application experience is enhanced.

Further, the embodiments of the present disclosure also provide a backlight driving circuit comprising the boosting circuit according to the embodiments of the present disclosure.

Further, the embodiments of the present disclosure also provide a backlight module comprising the backlight driving circuit according to the embodiments of the present disclosure.

It should be noted that the backlight driving circuit, the backlight module and the like according to the embodiments of the present disclosure are applicable to a display device such as a LCD (Liquid Crystal Display), an OLED (Organic Light-Emitting Diode) display, and the embodiments of the present disclosure have no limitations thereto.

It is apparent that various improvements and modifications can be made without departing from the principle of the present disclosure for those skilled in the art. Thus, if these improvements and variations fall into the protection scope of the appended claims and equivalents thereof, the improvements and variations are intended to be included within the scope of the present disclosure.

What is claimed is:

1. A boosting circuit, comprising a boosting chip, an energy-storage inductor, a freewheeling diode and a first capacitor, in which one terminal of the energy-storage inductor is connected with a signal input terminal of the boosting circuit, the other terminal thereof is connected with a pin of large current switch of the boosting chip and is further connected with a signal output terminal of the boosting circuit through the freewheeling diode; one terminal of the first capacitor is connected with a cathode of the freewheeling diode, and the other terminal is grounded; wherein:

the boosting circuit further comprises a current mirror unit, an input terminal of an inputting branch of the current mirror unit is connected with the cathode of the freewheeling diode, and an output terminal of the inputting branch is connected with the signal input terminal of the boosting circuit through a first resistor;

an input terminal of an outputting branch of the current mirror unit is connected with the cathode of the freewheeling diode, and an output terminal of the outputting branch is grounded through a second resistor, where an ungrounded terminal of the second resistor is connected with a signal feedback pin of the boosting chip.

2. The boosting circuit of claim 1, wherein a third resistor is connected in series between the output terminal of the outputting branch of the current mirror unit and the second resistor.

3. The boosting circuit of claim 1, wherein the current mirror unit comprises a first transistor and a second transistor;

a first electrode of the first transistor is connected with the input terminal of the inputting branch of the current mirror unit, a second electrode of the first transistor is connected with the output terminal of the inputting branch of the current mirror unit, and a third electrode of the first transistor is connected with a third electrode of the second transistor and is further connected with the second electrode of the first transistor; and a first electrode of the second transistor is connected with the input terminal of the outputting branch of the current mirror unit, and a second electrode of the second transistor is connected with the output terminal of the outputting branch of the current mirror unit.

4. The boosting circuit of claim 3, wherein the first transistor and the second transistor are PNP-type transistors, NPN-type transistors or Metal Oxide Semiconductor MOS transistors.

5. The boosting circuit of claim 1, wherein the freewheeling diode is a Schottky transistor.

6. The boosting circuit of claim 1, wherein a power supply input pin of the boosting chip is connected with the signal input terminal of the boosting circuit, and an analog ground pin and a power supply ground pin are grounded.

7. The boosting circuit of claim 6, wherein a loop compensating pin of the boosting chip is grounded through a series branch comprising of a second capacitor and a fourth resistor.

8. The boosting circuit of claim 6, wherein the signal input terminal is grounded through a third capacitor.

9. The boosting circuit of claim 1, wherein the current mirror unit enables a voltage difference of a fixed value to be existed between an output voltage of the boosting circuit and an input voltage of the boosting circuit, when the boosting circuit is in a stable operation state.

10. The boosting circuit of claim 9, wherein amplitude of the output voltage of the boosting circuit is adjusted according to a voltage difference between a feedback voltage received from the signal feedback pin and an internal feedback reference voltage of the boosting chip.

11. The boosting circuit of claim 10, wherein a duty ratio of a control signal is adjusted by adjusting a pulse width of an integrated field effect transistor inside the boosting chip, and in turn a duration of turn-on state of the internal integrated field effect transistor is adjusted, so that the value of the output voltage of the boosting circuit is adjusted.

12. A backlight driving circuit comprising the boosting circuit of claim 1.

13. A backlight module comprising the backlight driving circuit of claim 12.

14. The backlight driving circuit of claim 12, wherein a third resistor is connected in series between the output terminal of the outputting branch of the current mirror unit and the second resistor.

15. The backlight driving circuit of claim 12, wherein
the current mirror unit comprises a first transistor and a second transistor;
a first electrode of the first transistor is connected with the input terminal of the inputting branch of the current mirror unit, a second electrode of the first transistor is connected with the output terminal of the inputting branch of the current mirror unit, and a third electrode of the first transistor is connected with a third electrode of the second transistor and is further connected with the second electrode of the first transistor; and
a first electrode of the second transistor is connected with the input terminal of the outputting branch of the current mirror unit, and a second electrode of the second transistor is connected with the output terminal of the outputting branch of the current mirror unit.

16. The backlight driving circuit of claim 15, wherein the first transistor and the second transistor are PNP-type transistors, NPN-type transistors or Metal Oxide Semiconductor MOS transistors.

17. The backlight driving circuit of claim 12, wherein the freewheeling diode is a Schottky transistor.

18. The backlight driving circuit of claim 12, wherein a power supply input pin of the boosting chip is connected with the signal input terminal of the boosting circuit, and an analog ground pin and a power supply ground pin are grounded.

19. The backlight driving circuit of claim 18, wherein a loop compensating pin of the boosting chip is grounded through a series branch comprising of a second capacitor and a fourth resistor.

20. The backlight driving circuit of claim 18, wherein the signal input terminal is grounded through a third capacitor.

* * * * *